(12) United States Patent
Chamberlain

(10) Patent No.: X953
(45) Date of Patent: Nov. 21, 1808

(54) BOOTS & SHOES, MANUFACTURING

(76) Inventor: Samuel Chamberlain

The Schedule referred to in these Letters Patent & making part of the same, containing a Description in the Words of the said Samuel Chamberlain him-self of his Water proof Shoe &c.

The invention of this improvement in Boots &c has called the Water proof Shoe, consists in the application of an additional inner sole of cork saturated with melted tallow & bees wax, or with linseed oil which is preferable, or of half thick woolen cloth, or any other suitable sub-stance put on the inside of the common inner sole, with a cover of thin leather or cloth carried round the edges of the common inner sole, & sewed with the welt to said inner sole, so that the said additional inner sole of cork &c. is by said covering kept firmly in its place. The common inner sole is between this additional sole & the outer sole.

This additional inner sole being made of elastic substance covered with thin leather or cloth forms a very agreeable sur-face for the foot, & at the same time keeps the water from penetrating thro' to the foot. Between the lining & the up-per leather of the shoe a piece of bladder cut in the shape of the upper leather, is put, which will prevent the water from soaking thro' the upper leather, so as to wet the feet. - To prevent the water from getting into the shoe at the top of the vamp where it is laced or tied, a cap of a proper size & shape of leather is sewed on to the vamp so as to cover the lacing of the shoe. One corner of said Cap is not sewed to the vamp but is left so as to turn over in order to lace up the shoe.

This corner of said Cap is fastened to the vamp of the shoe by a clasp or buckle or by a string. Shoes made with these improvements will keep the feet dry & comfortable & are very easy for the feet. Canvass or even birch bark put between the outside & common inner soles of shoes will also give further security against the bad effects of water.

Bladder put between the said additional inner sole & the common inner sole or between the common inner sole & the outside sole, when the said additional inner sole is not used, have a good effect in keeping the water from soaking thro' to the feet. Women's shoes as well as men's shoes & boots may be made with any or all of these improvements, the cups only excepted in Boots, & at the same time will be as good in appearance as they are comfortable, warm & dry. Children's shoes are made with the above improvements will be found to tend very much to the preservation of their health; as well as to the health of every person of [illegible] age who wears them.

Witnesses

John Fairbanks.

William F. [illegible]

Samuel Chamberlain.

Patented November 21st 1808

Revised & Recorded Anew.

Oct 21st 1865.